No. 717,699. PATENTED JAN. 6, 1903.
A. P. MURDOCH.
APPARATUS FOR MANUFACTURING STARCH.
APPLICATION FILED DEC. 23, 1901.

NO MODEL. 2 SHEETS—SHEET 1.

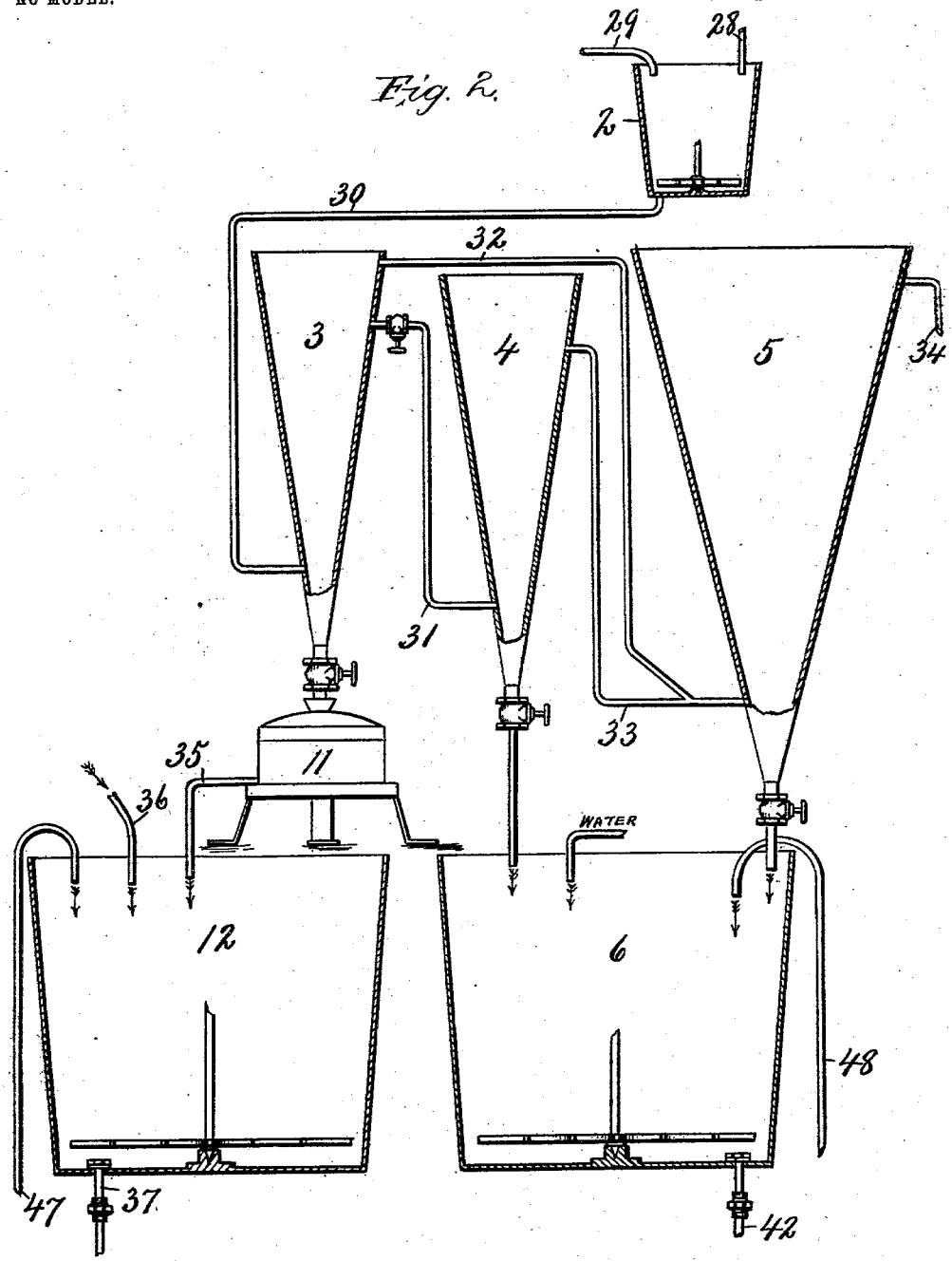

UNITED STATES PATENT OFFICE.

AUGUSTUS PETTIBONE MURDOCH, OF OSWEGO, NEW YORK.

APPARATUS FOR MANUFACTURING STARCH.

SPECIFICATION forming part of Letters Patent No. 717,699, dated January 6, 1903.

Application filed December 23, 1901. Serial No. 86,972. (No model.)

*To all whom it may concern:*

Be it known that I, AUGUSTUS PETTIBONE MURDOCH, of Oswego, in the county of Oswego, in the State of New York, have invented new and useful Improvements in Apparatus for Manufacturing Starch, of which the following, taken in connection with the accompanying drawings, is a full, clear, and exact description.

My invention relates to improvements in the art of and apparatus for manufacturing commercial starch, similar to that set forth in my pending application Serial No. 102,777, filed April 14, 1902.

The present system or method now in general use is found to be too primitive, laborious, and expensive to meet the rapidly-increasing large orders on short notice without carrying a very heavy stock. One of the steps in this old process which is particularly troublesome and expensive is the use of the series of vibratory or reciprocatory separators or bolting devices in which silk or other fabric screens are employed to separate the non-farinaceous substance from the starch. These screens soon become punctured or otherwise impaired in use to such an extent that portions of the coarser product are carried through the screens with the starch, thereby necessitating a constant watchfulness on the part of the attendants and requiring frequent renewal of the screens.

Another serious objection to the old system is the use of the "runs" or tables over which the liquor starch is required to pass before the starch is thoroughly separated from the gluten. These tables or runs cover a large area of floor-space, and therefore require extensive buildings for housing the same. This system also requires the employment of a number of attendants night and day to keep the liquor properly agitated as the same flows over the tables in order that the light non-farinaceous substance may be kept at the surface to flow off with the gluten and water, while the fecula or starch is precipitated onto the tables, from which it is usually shoveled into suitable conveyers. This light non-farinaceous substance which flows from the tables or runs and might be used for fodder is usually wasted, and while there are other features incidental to this old process which add to the expense, time, and labor of producing a perfect commercial starch I have only briefly specified the more salient disadvantages.

The primary object of this invention is to produce a commercially-pure starch expeditiously and in the simplest possible manner and to render the process as nearly automatic as may be possible.

Another object is to obviate the waste and many other disadvantages of the old method and to reduce the initial cost, floor-space, and the current expense of operation of the plant.

The more specific object of this improved apparatus is to provide a plurality of series of vats, which may be of the same or varying sizes and so relatively arranged as to effect an automatic and successive feed of the mash and liquor starch and their constituent elements from the initial introduction of the pulpy mass to the finished product, thereby obviating the use of all sieves, breakers, and boxing-tanks and at the same time separating and saving all of the useful elements and permitting the boxing of the starch direct from the conical vats.

To this end the invention consists in the various parts of a starch-manufacturing plant, as hereinafter fully described, and pointed out in the claims.

Referring to the drawings, Figure 1 is a diagrammatic view of a starch-manufacturing plant embodying my invention. Fig. 2 is an enlarged vertical sectional view of one of the detached series of vats and the mill and agitators connected thereto.

As seen in Fig. 1 of the drawings, this plant is divided into two main sections, one section being adapted to macerate, agitate, and separate the mash and its constituent elements for the purpose of separating the non-farinaceous product or "feed" from the starch-containing matter preparatory to discharging the liquor into suitable mixing-tanks, where it is treated with chemicals and suitably agitated, and the other section receiving the chemically-treated liquor for separating the starch from the liquor and finally discharging the starch in a thoroughly-finished condition. The first section preferably comprises a grinding or macerating mill 1, an agitator 2, a series of vats 3, 4, and 5, a second agitator 6, a second series of vats 7, 8, and 9, and mixing-tanks 10. In addition to the parts just mentioned and forming a part of the first section is a second grinding-mill 11, a third agitator-tank 12, and a third series of vats 13, 14, and 15, all of which parts are constructed and connected to operate in a manner hereinafter described.

The second section of the plant preferably consists of a fourth agitator 16, a fourth series of vats 17, 18, and 19, a fifth agitator 20, a fifth series of vats 21, 22, and 23, and a sixth agitator 24, discharging into one of a sixth series of vats 25, 26, and 27.

The grinding-mill 1 and agitator 2 of the first section may be of any desired form or construction adapted to thoroughly grind or macerate and agitate the substance from which the starch is subsequently extracted, the mill 1 discharging the ground material through a conduit 28 into the agitator-tank 2. Clean fresh water is also conducted from any suitable source to the tank 2 by a conduit 29, the mash being then thoroughly agitated with the water and is discharged from the bottom of said tank 2 through a conduit 30 to the base of the vat 3. These several vats of each series are substantially identical in form, and each preferably consists of an upright open-ended receptacle contracted at its base for forming a restricted discharge-opening, whereby the starch-containing matter and the non-farinaceous elements previously discharged into the base of the vat through the conduit 30 are automatically separated, the coarser material gravitating through the restricted or contracted open end at the base of the vat and the lighter starch and gluten-water normally arrange themselves in strata above the coarser product and are drawn off through separate conduits leading from the vat at points in planes above the discharge end of the inlet-conduit, as 30. In order to produce the best results, I preferably construct these vats in the form of a truncated cone or funnel having its apex at the bottom and forming a restricted discharge-opening for the precipitate or heavier material. The inlet-conduit 30 for conveying the mash or pulpy material into the first vat 3 preferably terminates within the vat at a point slightly above the restricted discharge-opening in its base. By thus discharging the pulpy material into the base of the cone said restricted opening tends to retard the free passage of the coarser and weightier matter which causes the lightest starch and gluten-water to assume a level a considerable distance above the heavier matter, while the starch of greater specific gravity assumes a level between the coarser material and the upper strata, and I therefore provide the vat A with additional outlet-conduits 31 and 32, the conduit 31 being tapped into the vat 3 in a plane above the discharge end of the conduit 30 and beneath the conduit 32 for the purpose of drawing off the liquor-starch at that particular level, and the conduit 32 serves to draw off the gluten-water and what lighter starch may be suspended therein. The vat 4 is similar in size and form to the vat 3, being provided with a contracted or restricted lower discharge-opening, and is adapted to receive the discharge of the heavier starch solution from the vat 3 in substantially the same manner as said vat 3 receives the pulpy mass or mash from the agitator 2—that is, the conduit 31 is arranged to discharge into the base of the vat 4 at a point slightly above its restricted discharge-opening, and the starch thus discharged being retarded in its passage through the restricted outlet-opening causes the liquor to assume a level above the heavier starch in the vat 4, thereby causing the starch which may be held in suspension by the water to precipitate through the restricted opening, while the water itself is drawn off through a conduit 33, leading from the upper end of the vat 4 and discharging into the base of the vat 5 in substantially the same manner as the conduits 30 and 31 discharge into the bases of the vats 3 and 4.

In order that the gluten-water and any lighter starch which may be held in suspension thereby may be conducted to the base of the vat 5 through a single opening, I preferably unite the conduits 32 and 33.

The vat 5 is preferably of greater capacity than the vats 3 or 4, but is similar in construction, being provided with a restricted opening at its base for discharging the heavier starch, which may be precipitated from the solution which enters its base at a point above the restricted opening. In the manner similar to the vats 3 and 4 the vat 5 is provided at its upper end with a conduit 34 for drawing off the water during the precipitation of the starch therefrom. This water being usually free from starch is permitted to go to waste.

Returning now to the first vat 3, the coarser or non-farinaceous material which is discharged from said vat enters the mill 11, where it is ground or macerated and is discharged therefrom through a conduit 35 into the agitator 12, water being admitted to the agitator through a conduit 36 for the purpose of more thoroughly cleansing the coarse feed from any starch which may still adhere thereto, it being understood that these agitators are provided with suitable rotary paddles or blades which may be actuated by any power not necessary to here describe for thoroughly agitating the mixture in order that the starch may be thoroughly separated from the coarse material. During this operation of agitating the material in the tank 12 the coarser material is discharged by gravity through a conduit 37 into the base of the vat 13 at a point above its restricted discharge-opening from which vat the coarse feed or pulp is discharged through its restricted opening between suitable rollers 38, which serve to press the moisture therefrom, and this coarser material is then used for fodder for cattle or other animals or for fertilizing.

The vats 13, 14, and 15 are substantially the same in form and construction as the vats 3, 4, and 5 and are similarly connected to each other by conduits 38, 39, and 40, the conduit 15 being provided with a water-overflow pipe 41. These conduits 37, 38, 39, 40, and 41 correspond with the conduits 30, 31, 32, 33, and 34, and the operation of extracting the starch from the fecula is substantially the same as that described for the vats 3, 4, and 5.

The vats 4 and 5 discharge through the restricted openings in the bases thereof into the agitator-tank 6, the greater part of the discharge from these vats being starch, although some of the gluten may be still present. Additional fresh water is then mixed with the starch-containing liquid in the tank 6, which is thoroughly agitated in a manner similar to that described for the agitator 12, and the precipitate starch is drawn off from the agitator-tank by gravity through a conduit 42 and discharged into the base of the vat 7 at a point above its restricted discharge-opening in substantially the same manner as the conduit 30 discharges into the vat 3.

The vat 7 forms one of the second series of washers or separators for the liquor starch, the other two vats 8 and 9 being connected successively to the vat 7 by conduits 43 44 45, corresponding, respectively, to the conduits 30 31 32 33, it being understood that the vats 5, 9, and 15, from which the waste water discharges, are larger than the other vats of their respective series, the vat 9 having an overflow 46.

In order to insure the perfect separation of the starch from any gluten or other deleterious substances, I preferably conduct the starch discharged from the vat 7 through a conduit 47 and discharge the same into the agitator-tank 12, where it is again passed through the agitator 12 and the vats 13, 14, and 15, the precipitate from the vats 14 and 15 being returned to the agitator 6 through a conduit 48, from which it passes through the vats 7, 8, and 9 for additionally and more thoroughly separating the starch from the liquor. After the material has been thus subjected to treatment through the several vats just described it is found to be almost entirely separated from the gluten after passing through the vats 8 and 9, from which it is conducted by suitable conduits 49 and 50 to the mixing-tanks 10, in which the starch liquor is mixed with suitable chemicals and agitated by any desired means to thoroughly mix the liquid starch with said chemicals.

The operation thus far described includes the treatment of the mash from the mill to the mixing-tanks, which forms the first section of my improved plant.

After the starch liquor is thoroughly mixed with the chemical in the mixing-tank 10 it is forced into the agitator-tank 16 through a conduit 51 by any desired means, as a pump 52, connected to said conduit. During the introduction of the mixture into the tank 16 fresh water is added to the mixture and the whole body is thoroughly agitated in said tank and discharged therefrom through a conduit 53 into the base of the vat 17 in proximity to its restricted discharge-opening. This vat 17 is similar to the vat 3 and is connected to the vats 18 and 19 by conduits 54, 55, and 56, corresponding to the conduits 31, 32, and 33, the vat 19 being provided with overflow or waste conduit 57, corresponding to the waste-conduit 34 of the vat 5. The starch precipitate is discharged through the restricted openings of the vats 18 and 19 through conduits 58 and 59, which are preferably united to each other and discharged into the agitator-tank 20, where additional fresh water is added to the mixture, which is again thoroughly agitated and discharged from the bottom of the tank 20 through a conduit 60 and into the base of the vat 21. This vat 21 is also similar to the vat 3 and is connected to the vats 22 and 23 by conduits 61, 62, and 63, corresponding to the conduits 31, 32, and 33, the vat 23 being provided with an overflow-conduit 64, corresponding to the overflow-conduit 34 of the vat 5.

The vats 17 and 21 are arranged to discharge into the agitator-tank 24 through conduits 65 and 66, additional fresh water being introduced into the tank 24, and the mixture therein is thoroughly agitated, and the precipitate is discharged through a conduit 67 into the vat 25. The vats 25, 26, and 27 correspond to the vats 3, 4, and 5 and are connected to each other by conduits 68, 69, and 70, corresponding to the conduits 31, 32, and 33, and the vat 27 is provided with an overflow-conduit 71, corresponding to the overflow-conduit 34 of the vat 5.

It has been found that a certain fine feed is precipitated through the restricted discharge-opening of the vat 25, and this feed is usually collected and is also used for fodder, if desired.

The precipitate from the vats 26 and 27 is conducted through suitable conduits 72 and 73 into the agitator-tank 20, where it is again mixed with fresh water and thoroughly agitated, and thus completes the cycle of circulation from the mill 1, as the liquor entering the tank 20 is conducted through the conduit 60 into the base of the vat 21, and any starch-containing liquor which may rise in the vat 21 is conducted to the vat 22 and from there to the vat 23, the precipitate in the last two vats 22 and 23 being commercially pure starch and may be taken directly from the discharge-conduits 74 or 75, leading, respectively, from the restricted discharge-openings of the vats 22 and 23, and conveyed to the drying apparatus without further preparation.

Although I have shown and described three vats, I do not wish to limit myself to the precise form or number of cones in each series, nor to the number of series of vats.

The operation of my invention will now be readily understood upon reference to the foregoing description and the accompanying drawings.

Having thus described my invention, what I claim, and desire to secure by Letters Patent, is—

1. In the manufacture of starch, an apparatus comprising a grinding-mill, an upright vat discharging at its base into the mill and having upper and intermediate outlets at different levels for drawing off the gluten-water and starch liquor separately, and means to feed the starch-containing matter to the vat.

2. In a starch-manufacturing apparatus, a vat receiving the starch-containing matter and provided with a restricted discharge-opening, a mill receiving the material from said discharge-opening, a tank receiving the discharge from the mill, a second vat connected to the former vat to receive the liquid starch therefrom and having a restricted discharge-opening, a second tank receiving the material from said latter opening, and an additional vat receiving the material from the second tank and connected to discharge a portion of its material into the first tank.

3. In a starch-manufacturing apparatus, a vat receiving the starch-containing matter and provided with a restricted discharge-opening, a mill and means for conveying the material from said discharge-opening to the mill, a tank receiving the discharge from the mill, a second vat connected to the former to receive liquid starch therefrom and having a restricted discharge-opening, a second tank receiving the material from said latter opening, and an additional vat connected to receive a portion of the starch liquor from the first tank and also connected to discharge a portion of its liquor into the second tank.

4. In a starch-manufacturing apparatus, a vat receiving the starch-containing matter and provided with a restricted discharge-opening, a tank and means for conveying the material from said discharge-opening to the tank, a second vat connected to the former to receive liquid starch therefrom and having a restricted discharge-opening, a second tank receiving the material from said latter opening, and additional vats each being connected to receive material from one of the tanks and to discharge portions thereof into the other tank.

5. A starch-manufacturing plant comprising a series of vats, each having a contracted lower end provided with an opening for discharging a precipitate, means for conducting the starch-containing matter to the base of one vat above said opening, and additional means for conducting portions of the liquid from the upper end of said one of the vats to the base of the other at a point above the lower end opening.

6. In a starch-manufacturing plant, in combination with a grinding-mill, an agitator-tank receiving the mash from the mill, an upright vat having a restricted discharge-opening, a conduit leading from the agitator and discharging into the base of the vat above its discharge-opening, a second upright vat having a restricted discharge-opening, a conduit leading from the upper portion of the first vat to the base of the second vat above its discharge-opening, and a second agitator-tank receiving the material from the second vat.

7. In the manufacture of starch, means for macerating and liquefying the starch-containing material, a series of upright conical vats having their apexes at the bottom, means for feeding the starch-containing material to one of the vats, said vats being connected to feed the starch liquor successively from one to the other, and each provided with a discharge-opening at its apex, a macerating device receiving the discharge from the apex of said one of the vats, a tank receiving the macerated material from said device, and a second tank receiving the discharge from the apexes of the other vats.

8. In the manufacture of starch, means for macerating and liquefying the starch-containing material, a series of upright conical vats having their apexes at the bottom, means for feeding the starch-containing material to one of the vats, said vats being connected to feed the starch liquor successively from one to the other, and each provided with a discharge-opening at its apex, a macerating device receiving the discharge from the apex of said one of the vats, a tank receiving the macerated material from said device, and a second tank receiving the discharge from the apexes of the other vats, a second series of upright conical vats having their apexes at the bottom and provided with discharge-openings, one of said vats receiving the discharge from one of said tanks, connections whereby the starch liquor is fed successively from said one of the vats of the second series through the remaining vats of the second series, and means for receiving the discharge from the apexes of the remaining vats and conducting the same to the other tank.

9. In the manufacture of starch, a series of upright conical vats connected to feed the starch liquor successively from one to the other by gravity and having open apexes at the bottom, means for feeding the starch-containing material to one of the vats, means for collecting the precipitate from the apex of said one of the vats, a tank receiving the discharge from the apexes of the remaining vats, a second series of upright conical vats having open apexes at the bottom, the vats of the second series being connected to feed liquor successively from one to the other, means for conducting the material from the tank to one of the vats of the second series, a third series of upright conical vats connected to discharge the starch liquor successively from one to the other and means for conveying the material discharged from the apex of said one of the vats of the second series to one of the vats of the third series for the purpose described.

10. In the manufacture of starch, a series of upright conical vats connected to feed the starch liquor successively from one to the other by gravity and having open apexes at the bottom, means for feeding the starch-containing material to one of the vats, means for collecting the precipitate from the apex of said one of the vats, a tank receiving the discharge from the apexes of the remaining vats, a second series of upright conical vats having open apexes at the bottom, the vats of the second series being connected to feed liquor successively from one to the other, means for conducting the material from the tank to one of the vats of the second series, a third series of upright conical vats connected to discharge the starch liquor successively from one to the other and means for conveying the material discharged from the apexes of the remaining vats of the third series to said tank.

11. In the manufacture of starch, a series of upright conical vats connected to feed the starch liquor successively from one to the other by gravity and having open apexes at the bottom, means for feeding the starch-containing material to one of the vats, means for collecting the precipitate from the apex of said one of the vats, a tank receiving the discharge from the apexes of the remaining vats, a second series of upright conical vats having open apexes at the bottom, the vats of the second series being connected to feed liquor successively from one to the other, means for conducting the material from the tank to one of the vats of the second series, a third series of upright conical vats connected to discharge the starch liquor successively from one to the other and means for conveying the material discharged from the apex of said one of the vats of the second series to one of the vats of the third series for the purpose described and means for conveying the material discharged from the apexes of the remaining vats of the third series to said tank.

12. In the manufacture of starch, a series of upright conical vats connected to feed the starch liquor successively from one to the other by gravity and having open apexes at the bottom, means for feeding the starch-containing material to one of the vats, means for collecting the precipitate from the apex of said one of the vats, a tank receiving the discharge from the apexes of the remaining vats, a second series of upright conical vats having open apexes at the bottom, the vats of the second series being connected to feed liquor successively from one to the other, means for conducting the material from the tank to one of the vats of the second series, a third series of upright conical vats connected to discharge the starch liquor successively from one to the other, means for conveying the material discharged from the apex of said one of the vats of the second series to one of the vats of the third series for the purpose described, and means for collecting the discharge from the apexes of the remaining vats of the second series.

In witness whereof I have hereunto set my hand this 13th day of December, 1901.

AUGUSTUS PETTIBONE MURDOCH.

Witnesses:
N. S. BENTLEY,
FRANCIS E. CULLEN.